Aug. 28, 1962  J. H. STOUDENMIRE  3,051,882
CONTROL TRANSFORMER SYNCHRO REMOTE POSITIONING SYSTEM
Filed June 17, 1959  2 Sheets-Sheet 1

INVENTOR
JAY H. STOUDENMIRE
BY
K. G. Doub
ATTORNEY

Aug. 28, 1962   J. H. STOUDENMIRE   3,051,882
CONTROL TRANSFORMER SYNCHRO REMOTE POSITIONING SYSTEM
Filed June 17, 1959   2 Sheets-Sheet 2

INVENTOR
JAY H. STOUDENMIRE
BY K. G. Doub
ATTORNEY

United States Patent Office 3,051,882
Patented Aug. 28, 1962

3,051,882
CONTROL TRANSFORMER SYNCHRO REMOTE
POSITIONING SYSTEM
Jay H. Stoudenmire, Baltimore, Md., assignor to The Bendix Corporation, a corporation of Delaware
Filed June 17, 1959, Ser. No. 820,970
9 Claims. (Cl. 318—30)

In self-synchronous transmission systems designed to maintain a driven member, such as a wind direction indicator, in positional accord with a driving member, such as a wind direction transmitter, instead of electrically interconnecting the secondaries or polycircuit windings of the transmitter synchro and repeater synchro, it is common practice to utilize a follow-up motor or servo and associated control circuitry for positioning the receiver rotor. This isolates the receiver from the transmitter and avoids unfavorable torque reactions on and overloading of the transmitter rotor, a feature of particular advantage where one transmitter is to serve a plurality of repeaters. The patent to Wood, No. 2,407,200, describes and illustrates a follow-up system which is essentially of the mechanical type, including a power-amplifying servo motor for positioning the receiver synchro rotor, and while the system of this patent has for many years satisfactorily performed its intended function, it has been found much too costly and bulky for many installations; and the same objection holds true with other prior known arrangements of this general type.

The primary object of the present invention therefore is to provide a simple, compact electromechanical follow-up system capable of functioning effectively as an isolator and power amplifier in a self-synchronous system.

Another object is to provide an electromechanical follow-up system for the purpose specified which does not require the use of precision-built two-phase motors and electronic amplifiers utilizing costly components.

A further object is to provide an electromechanical follow-up system particularly adapted for wind-direction indication.

The foregoing and other objects will become apparent in view of the following description taken in conjunction with the drawings, wherein.

Briefly stated, in the herein disclosed system a position signal (torque) transmitter is connected in synchro-tie with a synchro control transformer whose rotor winding is connected across the primary of an input transformer for a specially-designed type of reversing circuit or network capable of utilizing a low-cost single-phase shaded-pole servo motor, reversible by short-circuiting its shading coils, the servo motor having a follow-up driving connection through a gear train with the rotor of the control transformer. The transmitter rotor and excitation winding of the servo motor are connected to a common source of alternating potential, and the system is phased in a manner such that the servo motor will drive the rotor of the control transformer through the gear train towards minimum error signal at all times. A position signal output synchro transmitter has its rotor mechanically coupled to the same shaft that drives the control transformer rotor and its stator windings electrically connected to the like windings of any one or more synchro torque receivers functioning as repeaters.

Figure 1:
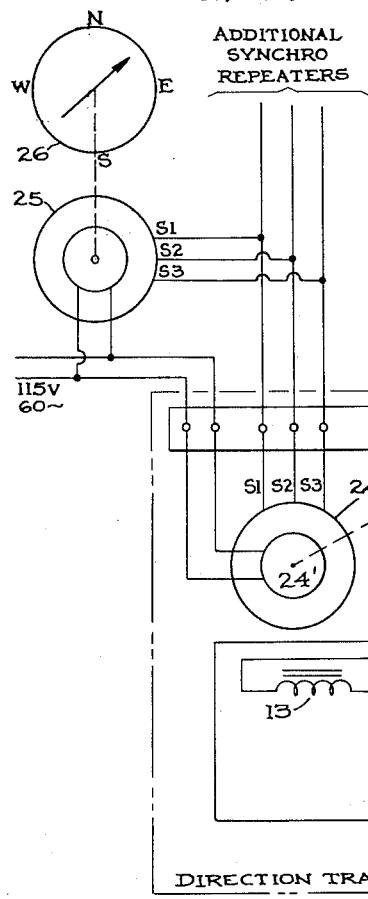
FIG. 1 is a schematic of an electromechanical system in accordance with the invention.
Figure 1:
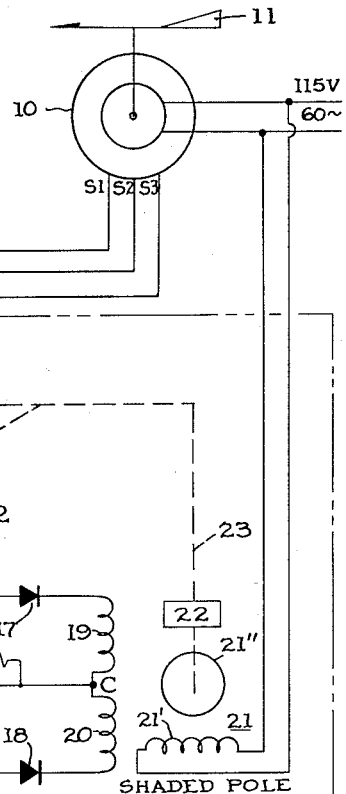
Figure 2:
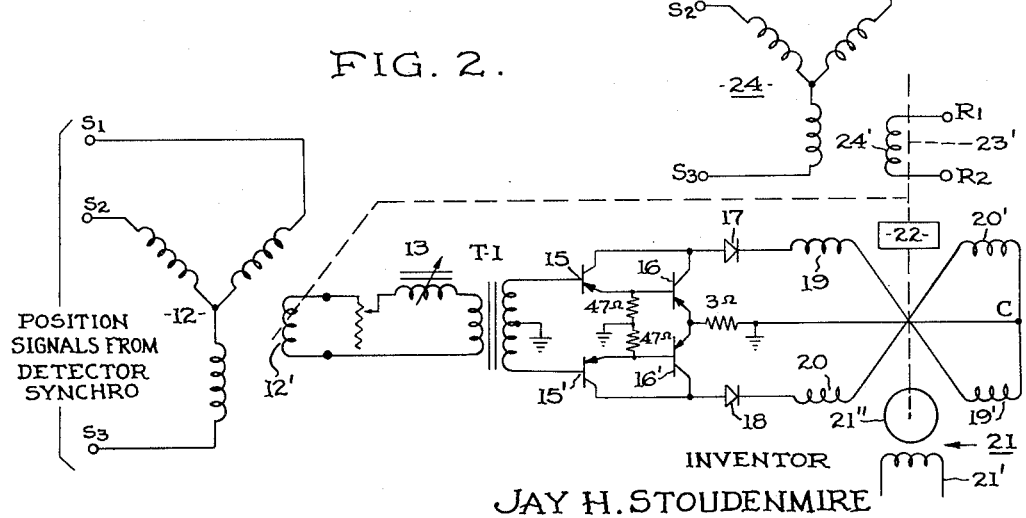
FIG. 2 is an electrical diagram of the basic components of said system.

Referring to the drawings, a self-synchronous transmitter 10 has its rotor positioned by a wind vane 11 and its stator windings interconnected with like windings of a control transformer 12, which may be of the conventional type as shown in electrical diagram in FIG. 2. The rotor 12' of the control transformer has its winding connected across the primary of an error-signal input transformer T–1. The inductance at 13 should be of a value such as will compensate for the phase shift inherent in the transmitter synchro 10 and control transformer 12, and thus obtain an exact zero or 180 degree phase relation with the supply line voltage. The secondary of the transformer T–1 is center-tapped and has its end terminals connected to the signal input side of a servo motor control circuit or network generally indicated at 14. In its preferred form, this circuit comprises a pair of electron discharge devices 15, 15' which are preferably of the solid state type (transistors) connected as emitter-followers to function primarily as buffers which present a high impedance load to the rotor 12' of the control transformer 12. The triodes 15, 15' are connected in series with another pair of electron discharge devices 16, 16' of the solid state type which have a switching function, the collector or discharge circuits of which lead through diodes 17 and 18 to the input terminals of shading coils 19 and 20 of a servo motor 21, having its exciting or field coil 21' connected to the same source of supply as that for the transmitter 10, and its rotor 21" mechanically connected through a gear reduction unit 22 to the rotor 12' of the control transformer 12 as indicated in dotted lines at 23. Usually a shaded pole motor for this purpose has four shading coils, as in FIG. 2, but for purposes of simplicity, only two such coils are shown in FIG. 1.

The rotor 21" of the servo motor 21 is also mechanically connected, as indicated at 23', to the rotor 24' of an output synchro transmitter 24, the stator windings of which are electrically connected to like windings of a repeater synchro 25. The rotors of transmitter synchro 24 and repeater synchro 25 are connected to a common source of A.C. supply. The rotor of the synchro 25 is shown as driving a wind direction indicator 26.

Figure 3:
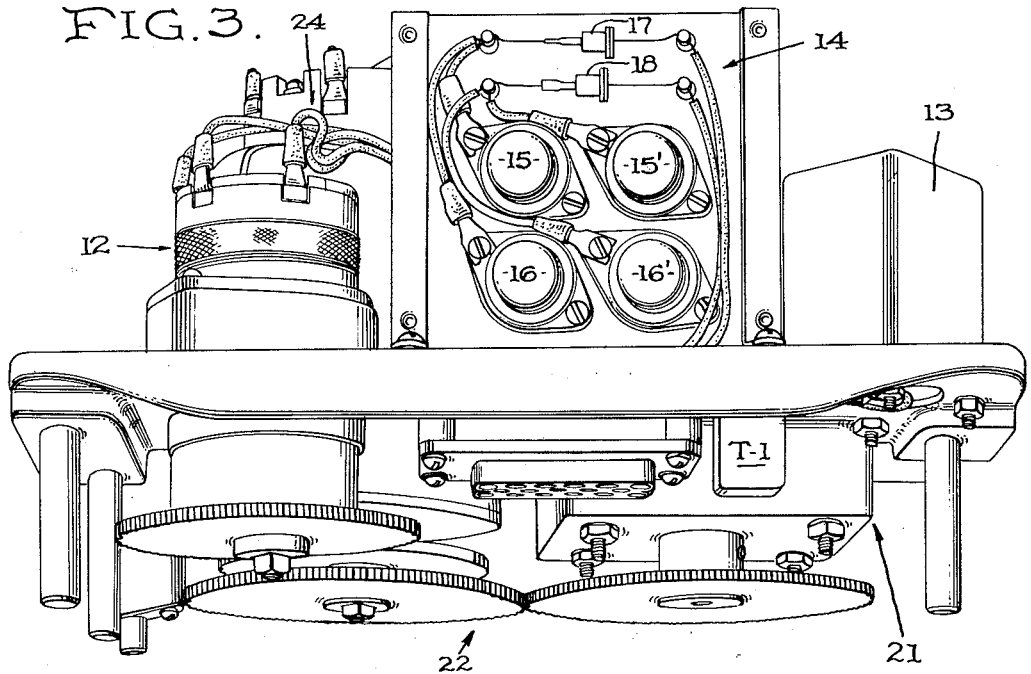
FIGS. 3 and 4 are views in perspective and top plan, respectively, of a physical embodiment of the system of FIGS. 1 and 2.
Figure 4:
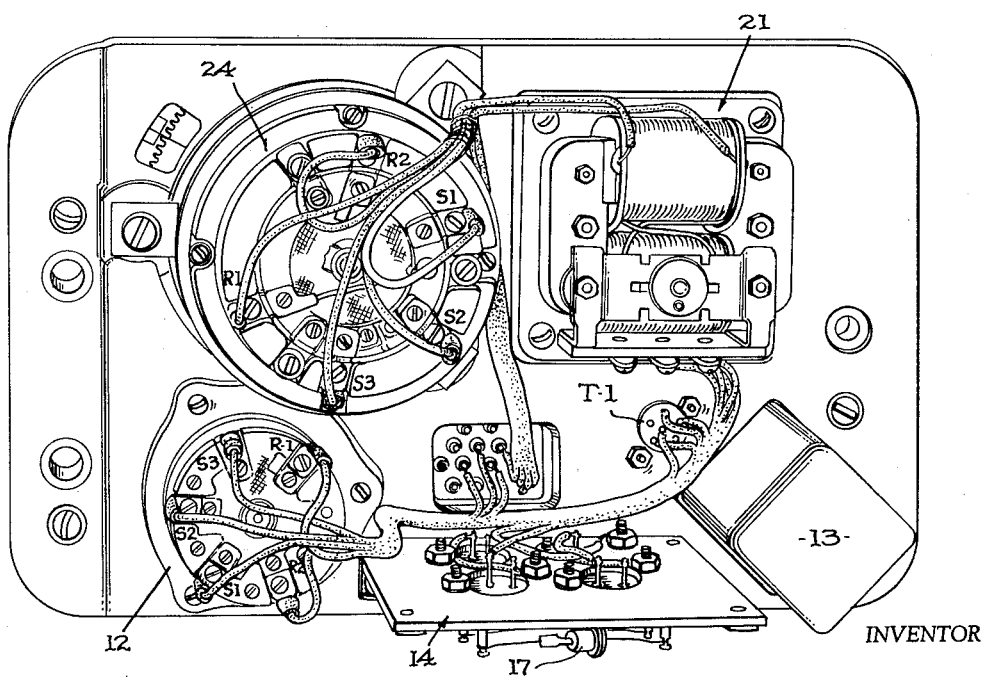

Little need be said about FIGS. 2 and 3 since the principal components are identified by like reference characters in FIGS. 1 and 2.

Operation

The electrical output of the control transformer 12 is a sine wave, the magnitude and phase of which is a direct function of the difference in angular position between its rotor 12' and that of the transmitter or detector synchro 10; and the angular position of the rotor 12' is determined by the follow-up servo motor 21 which responds to the error signal to bring the control transformer rotor into correspondence with the transmitter rotor.

The shaded pole windings 19, 20 of the servo motor 21 receive power by inductive coupling from the field winding 21'; they are not otherwise electrically connected to the field winding or the external circuit. The transistors of the motor-reversing circuit 14 receive operating power from the said shade windings, and the error signal from the rotor 12' through transformer T–1 controls this power to determine the direction of rotation of the rotor 21" of motor 21. The motor 21 is electrically connected to the control circuit 14 and mechanically connected to the rotor 12' in a manner such as to drive said rotor in the direction of minimum error signal at the output of rotor 12'. All transistors are of the PNP type and hence will conduct only when their base and collector elements are negative or in the negative region.

During a constant rotor position of the transmitter synchro 10, a null signal condition exists at the rotor 12' of the control transformer 12, and the signal voltage is then of such low value that the output of transformer T-1 has little effect on the motor-reversing circuit 14. However, upon a change in wind direction and consequent repositioning of the rotor of the transmitter or detector synchro 10, an error signal will appear across the rotor of the control transformer having a zero or 180 degree phase relationship with the supply line voltage, depending upon the direction of angular displacement of the rotor 12' from the minimum error signal position.

When an error signal appears across the rotor 12', a like signal appears across the primary of the transformer T-1; but since the secondary is center-tapped, the error signal is split into two signals of opposite phase, one being imposed on the base element of the transistor 15 and the other on the base element of the transistor 15'. Due to the common collector or emitter follower connection of the transistors 15 and 15' of the control network 14, the signals appearing on the bases of transistors 16 and 16' will have the same phase relationship as the split error signals appearing on the secondary of transformer T-1. It should be noted that the voltages induced in the shading coils 19 and 20 are in phase with each other when considered with respect to their common return connection at C. Therefore either transistor 16 or 16' will be caused to conduct, depending on which is driven by the in-phase error signal.

The two 47 ohm resistors connected in the base circuits of transistors 16 and 16' serve to provide low resistance shunt paths for the collector leakage currents, which may reach excessive values at high ambient temperatures. To further stabilize the operating points of transistors 16 and 16', a 3 ohm resistor is connected in the common emitter return circuit to provide degenerative bias. The 3 ohm resistor also serves to drive the non-conducting transistor to cut off when an error signal is present on the other transistor base, and thus improves overall performance at all ambient temperatures. The values assigned to these resistors are purely by way of example and will of course vary with the type of transistor used.

The rotor of the servo motor 21 will now rotate in a direction towards minimum error signal position, driving the rotor 12' of the control transformer 12 in a like direction, and since the rotor 21" of the servo motor 21 is also mechanically coupled to the rotor of the output synchro transmitter 24, the latter will turn and transmit a position signal to the repeater synchro 25 and any additional repeaters connected in parallel therewith. For large angular displacement differences between the rotors of 10 and 12, the maximum speed of the servo motor 21 is determined by the saturation characteristics of the transistors.

The herein-described system is particularly adapted for wind-direction indication due to the fact that oscillations of the wind vane due to quick shifting, strong winds on gusty days are damped by the gear train or gear reduction unit in the drive connection between the servo motor 21 and control transformer rotor 12'.

What I claim is:

1. In a self-synchronous transmission system for maintaining one or more signal output devices in accord with the angular position of the rotor of a transmitter synchro connected to a source of alternating current supply potential, a control transformer having a rotor provided with a winding inductively related to the stator windings of the transmitter synchro to generate a position error signal in said rotor winding having a nearly zero or 180 degree phase relationship with the supply potential depending upon the direction of angular displacement of the control transformer rotor from minimum error signal position; a follow-up servo motor having a rotor drivingly coupled to the rotor of the control transformer, an excitation winding and reversing windings inductively coupled to said excitation winding, the rotor of the synchro transmitter and the excitation winding of said servo motor having like alternating current supply potentials, a motor reversing network interconnecting the output of the control transformer and said reversing windings including a plurality of transistor means arranged in two separate channels connected to receive potential from said reversing windings, said transistor means being phase responsive for initiating a flow of current through a reversing winding in a direction to drive the servo motor and hence the control transformer rotor toward minimum error signal position when the error signal is in phase with the voltage induced in said reversing windings, and a signal-output device also drivingly coupled to said servo motor.

2. In a self-synchronous transmission system for maintaining one or more signal-output devices in accord with the angular position of the rotor of a transmitter synchro connected to a source of alternating current supply potential, a control transformer having a rotor provided with a winding inductively related to the stator windings of the transmitter synchro to generate a position error signal in said rotor winding having a nearly zero or 180 degree phase relationship with the supply potential depending upon the direction of angular displacement of the control transformer rotor from minimum error signal position; a follow-up servo motor having a rotor drivingly coupled to the rotor of the control transformer, an excitation winding having an alternating current supply potential similar to that of the transmitter and at least two reversing windings inductively coupled to said excitation winding, a motor reversing network interconnecting the output of the control transformer and said reversing windings including electron discharge devices arranged in separate channels and each channel being supplied with potential from one of said two reversing windings, said electron discharge devices being controlled by the in-phase error signal to initiate a flow of current through either one or the other of said reversing coils, depending upon which one is in phase with the error signal, in a direction to drive the servo motor and hence the rotor of the control transformer towards minimum error signal position, and a signal output device also drivingly coupled to said servo motor.

3. In a self-synchronous transmission system for maintaining one or more signal output devices in accord with the angular position of the rotor of a transmitter synchro connected to a source of alternating current supply potential, a control transformer having a rotor provided with a winding inductively related to the stator windings of the transmitter synchro to generate a position error signal in said rotor winding having a nearly zero or 180 degree phase relationship with the supply potential depending upon the direction of angular displacement of the control transformer rotor from minimum error signal position; a follow-up servo motor having a rotor drivingly coupled to the rotor of the control transformer, an excitation winding having an alternating current supply potential similar to that of the transmitter and at least two reversing windings inductively coupled to said excitation winding; a motor-reversing network including a signal-input transformer having its primary connected in circuit with said rotor output winding and its secondary center-tapped to split the error signal into two signals of opposite phase, a pair of solid state triodes connected in emitter-follower relation to provide a high input impedance for minimum loading of the control transformer and associated current rectifiers interconnecting the output terminals of said secondary with said reversing windings, said triodes being controlled by the in-phase error signal to initiate a flow of current through either one or the other of said reversing coils and drive the servo-motor and hence the rotor of the control transformer towards minimum error signal position, and a signal output device also drivingly coupled to said servo motor.

4. In a self-synchronous transmission system for maintaining one or more synchro repeaters in accord with the angular position of the rotor of a transmitter synchro connected to a source of alternating current supply potential, a control transformer having a rotor provided with a winding inductively related to the stator windings of the transmitter synchro to generate a position error signal in said rotor winding having a nearly zero or 180 degree phase relationship with the supply potential depending upon the direction of angular displacement of the control transformer rotor from minimum error signal position; a follow-up servo motor drivingly coupled to the transformer rotor and having an exciting winding supplied with an alternating current potential similar to that of the transmitter and at least two shaded pole windings inductively related to said exciting winding, means interconnecting the output of the control transformer and said shaded pole winding for initiating a flow of current through one or the other of the shaded pole windings in a direction to drive the servo motor and hence the control transformer rotor toward minimum error signal position when the error signal is in phase with the supply potential said means including a plurality of solid state triodes arranged in two channels, one of which is connected to each of said shaded pole windings for receiving operating potential, and a signal-output transmitter synchro having its rotor also drivingly coupled to said servo motor.

5. The system as claimed in claim 4 wherein the servo motor drive on the control transformer rotor is through a gear reduction unit which provides a damping action with respect to oscillatory movements of the position signal input transmitter rotor.

6. The system as claimed in claim 4 wherein the means interconnecting the output of the control transformer and said shaded pole windings is in the form of a motor-reversing network comprising a signal-input transformer having its primary connected in circuit with the rotor winding of the control transformer and its secondary center-tapped to split the error signal into two signals of opposite phase connected to each of said two channels, each of said channels including a pair of solid-state triodes connected in series plus an associated current rectifier for each phase interconnecting the output terminals of said secondary with said shaded pole windings which triodes are driven into conduction when the error signal is in phase with the supply potential, one of said triodes functioning as a buffer and the other as a switching triode.

7. In a self-synchronous transmission system, a source of A.C. supply potential, a null-seeking control transformer having a displaceable control element which when displaced from null position generates a position error signal having a nearly zero or 180 degree phase relationship with the supply potential depending upon the direction of displacement, a follow-up servo motor drivingly coupled to said control transformer and having an excitation winding supplied with an A.C. current potential similar to that of said source and at least two reversing windings inductively related to said excitation winding, means including at least two transistors each of which is arranged to receive power from one of said reversing windings interconnecting the output of the control transformer and said reversing windings for initiating a flow of current through one or the other of said reversing windings in a direction to drive the servo motor and hence the control transformer toward minimum error signal position, and a signal-output device also drivingly coupled to said servo motor.

8. The system as claimed in claim 7 wherein said means interconnecting the output of the control transformer and said reversing windings includes a motor-reversing network provided with a signal-input transformer having its primary connected to the output of the control transformer and its secondary center-tapped to split the error signal into two signals of opposite phase, said transistor being controlled by the in-phase error signal to initiate a flow of current through either one or the other of said reversing windings and drive the servo motor and hence the control transformer toward minimum error signal position.

9. In a self-synchronous transmission system for maintaining one or more signal output devices in accord with the angular position of the rotor of a transmitter synchro connected to a source of alternating current supply potential, a control transformer having a rotor provided with a winding inductively related to the stator windings of the transmitter synchro to generate a position error signal in said rotor winding having a phase relationship with the supply potential depending upon the direction of angular displacement of the control transformer rotor from minimum error signal position: a follow-up servo motor having a rotor drivingly coupled to the rotor of the control transformer, an excitation winding having an alternating current supply potential similar to that of the transmitter and at least two reversing windings inductively coupled to said excitation winding: a motor-reversing network including a signal input including a signal input transformer having its primary winding connected in circuit with said rotor output winding and its secondary winding center tapped to split the error signal into two signals of opposite phase, at least one transistor device for each phase and associated current rectifiers interconnecting the output terminals of said secondary winding with said reversing windings, said reversing windings providing the sole source of potential for said transistors, said transistors being controlled by the in-phase error signal to initiate a flow of current through either one or the other of said reversing coils to drive the servo motor and hence the rotor of the control transformer toward minimum error signal position, and a signal output device also drivingly coupled to said servo motor.

References Cited in the file of this patent

UNITED STATES PATENTS

| 2,458,701 | Greenough | Jan. 11, 1949 |
| 2,514,555 | Noxon | July 11, 1950 |
| 2,549,829 | Lilja | Apr. 24, 1951 |
| 2,783,423 | Streater et al. | Feb. 26, 1957 |
| 2,808,550 | Carney | Oct. 1, 1957 |
| 2,871,431 | Brook | Jan. 27, 1957 |